United States Patent
Khurana et al.

(10) Patent No.: US 6,735,489 B1
(45) Date of Patent: May 11, 2004

(54) HORIZONTALLY STRUCTURED MANUFACTURING PROCESS MODELING

(76) Inventors: Pravin Khurana, 6875 Green Meadow Dr., Saginaw, MI (US) 48603; Diane M. Landers, 10600 E. Townline Rd., Frankenmuth, MI (US) 48734

( * ) Notice: Subject to any disclaimer, the term of this patent is extended or adjusted under 35 U.S.C. 154(b) by 0 days.

(21) Appl. No.: 09/483,301

(22) Filed: Jan. 14, 2000

(51) Int. Cl.[7] .............................................. G06F 19/00
(52) U.S. Cl. ............................................. 700/95; 703/1
(58) Field of Search .............................. 700/95, 96, 97, 700/98, 94, 103, 118; 703/1, 2; 345/764, 850, 853

(56) References Cited

U.S. PATENT DOCUMENTS

| | | | |
|---|---|---|---|
| 5,351,196 A | 9/1994 | Sowar et al. | 700/182 |
| 5,434,791 A | 7/1995 | Koko et al. | 700/97 |
| 5,467,293 A * | 11/1995 | Summer et al. | 703/2 |
| 5,659,493 A | 8/1997 | Kiridena et al. | 703/2 |
| 5,710,709 A | 1/1998 | Oliver et al. | 700/184 |
| 5,768,136 A | 6/1998 | Fujiwara et al. | 700/182 |
| 5,808,432 A | 9/1998 | Inoue et al. | 318/561 |
| 5,815,154 A * | 9/1998 | Hirschtick et al. | 345/853 |
| 6,073,056 A | 6/2000 | Gawronski et al. | 700/98 |
| 6,120,171 A * | 9/2000 | Shaikh | 700/98 |
| 6,219,049 B1 * | 4/2001 | Zuffante et al. | 345/764 |
| 6,219,055 B1 * | 4/2001 | Bhargava et al. | 345/850 |
| 6,323,863 B1 | 11/2001 | Shinagawa et al. | 345/441 |
| 6,341,153 B1 | 1/2002 | Rivera et al. | 378/4 |
| 6,356,800 B1 | 3/2002 | Monz et al. | 700/184 |
| 6,430,455 B1 | 8/2002 | Rebello et al. | 700/105 |

OTHER PUBLICATIONS

Hemmett, Fussell, Jerard: "A Robust and Efficient Approach to Feedrate Selection for 3–axis Machining" ASME International Mechanical Engineering Congress and Exposition, Nov. 2000 (2000–11).

Roth D et al: "Surface swept by a toroidal cutter during 5–axis machining" Computer Aided Design, Elsevier Publishers BV., Barking, GB, vol. 33, No. 1, Jan. 2001 (2001–01), pp. 57–63.

Spence A D et al: "Integrated solid modeller based solutions for machining" Computer Aided Design, Elsevier Publishers BV., Barking, GB, vol. 32, No. 8–9, Aug. 2000 (2000–08), pp. 553–568.

Wang W P et al: "Geometric Modeling for Swept Volume of Moving Solids" IEEE Computer Graphics and Applications, IEEE Inc. New York, US, vol. 6, No. 12, Dec. 1, 1986, pp. 8–17.

William H. Beyer, Ph.D., editor; CRC Handbook of Mathematical Sciences, 5th Edition, 1978, pp. 354–355.

Sridhar S. Condoor, "Integrating Design in Engeneering Graphics Courses Using Feature–Based, Parametric Solid Modeling," ASEE/IEEE Frontiers in Education Conference 12d2–13; 1999; pp. 12d2–13–12d2–17.

Chih–Hsing Chu and Chun–Fong You; "Operation Planning in NC Programming Based on CAD Systems," found at http://dnclab.berkeley.edu/Ima/people/chchu/paper/NCoptim. html.

Solid Edge User's Guide Version 8 2000.
What's New in Unigraphics V16.0 User Guide; 1999.

* cited by examiner

*Primary Examiner*—Leo Picard
*Assistant Examiner*—Chad Rapp
(74) *Attorney, Agent, or Firm*—Michael D. Smith

(57) ABSTRACT

Disclosed is a horizontal structure method of CAD/CAM manufacturing where a base feature is provided and one or more form features added to it to form a model. The form features are added in an associative relationship with the base feature, preferable a parent child relationship, but are added in a way as to have substantially no associative relationships with each other. The result is a horizontally-structured Master Process Model where any one form feature can be altered or deleted without affecting the rest of the model. Extracts are then made of the Master Process Model to show the construction of the model feature by feature over time. These extracts are then used to generate manufacturing instructions that are used to machine a real-world part from a blank shaped like the base feature.

9 Claims, 6 Drawing Sheets

HORIZONTALLY STRUCTURED MANUFACTURING PROCESS MODELING

FIELD OF THE INVENTION

This invention relates to Computer-Aided Design and Computer-Aided Manufacturing (CAD/CAM) methods.

BACKGROUND OF THE INVENTION

CAD/CAM software systems are long known in the computer art. Some utilize wire-and-frame methods of building models while others utilize form features. In the form feature method of building CAD/CAM models, physical features are added to the model in an associative relationship with whatever other feature they are immediately attached to. The drawback is that the alteration or deletion of any one feature will result in the alteration or deletion of any other features attached to it. This makes altering or correcting complicated models rather time-consuming.

BRIEF SUMMARY OF THE INVENTION

Disclosed herein is a horizontal method of CAD/CAM manufacturing that is novel and superior over the vertical methods of the prior art. The invention permits alterations, additions, and deletions of individual features (e.g., holes, bosses, etc.) of a virtual part, wherein a change in any one feature is independent of the remaining features. The invention may be implemented on any CAD/CAM software package that supports (a) reference planes or their Cartesian equivalents, (b) parametric modeling or its equivalent, and (c) feature modeling or its equivalents.

The invention is to utilize a "horizontal tree structure" in adding form features to a model by establishing an exclusive parent/child relationship between a set of reference planes and each form feature. The reference planes themselves are children of a parent base model that may correspond to a real-world part or blank in the manufacturing process of the model. The parent/child relationship means that changes to the parent will affect the child, but changes to the child have no effect upon the parent. Since each added form feature of the model is related exclusively to a reference coordinate, then individual features may be added, edited, suppressed or deleted individually without affecting the rest of the model.

The order of addition of the form features may be controlled by the user and "extracts" made of the model each showing an additional step to be performed in the manufacture of the model in accordance with the order. Each extract is in the nature of a "snapshot" of the manufactured model in progress that may then be used to generate process sheets or electronic instructions for machining tools to manufacture a real-world version of the CAD/CAM model. The method is novel and superior over prior art "vertical" structures wherein changes or deletions to any one feature affect all features connected to that feature.

DETAILED DESCRIPTION OF THE INVENTION

Figure 1:
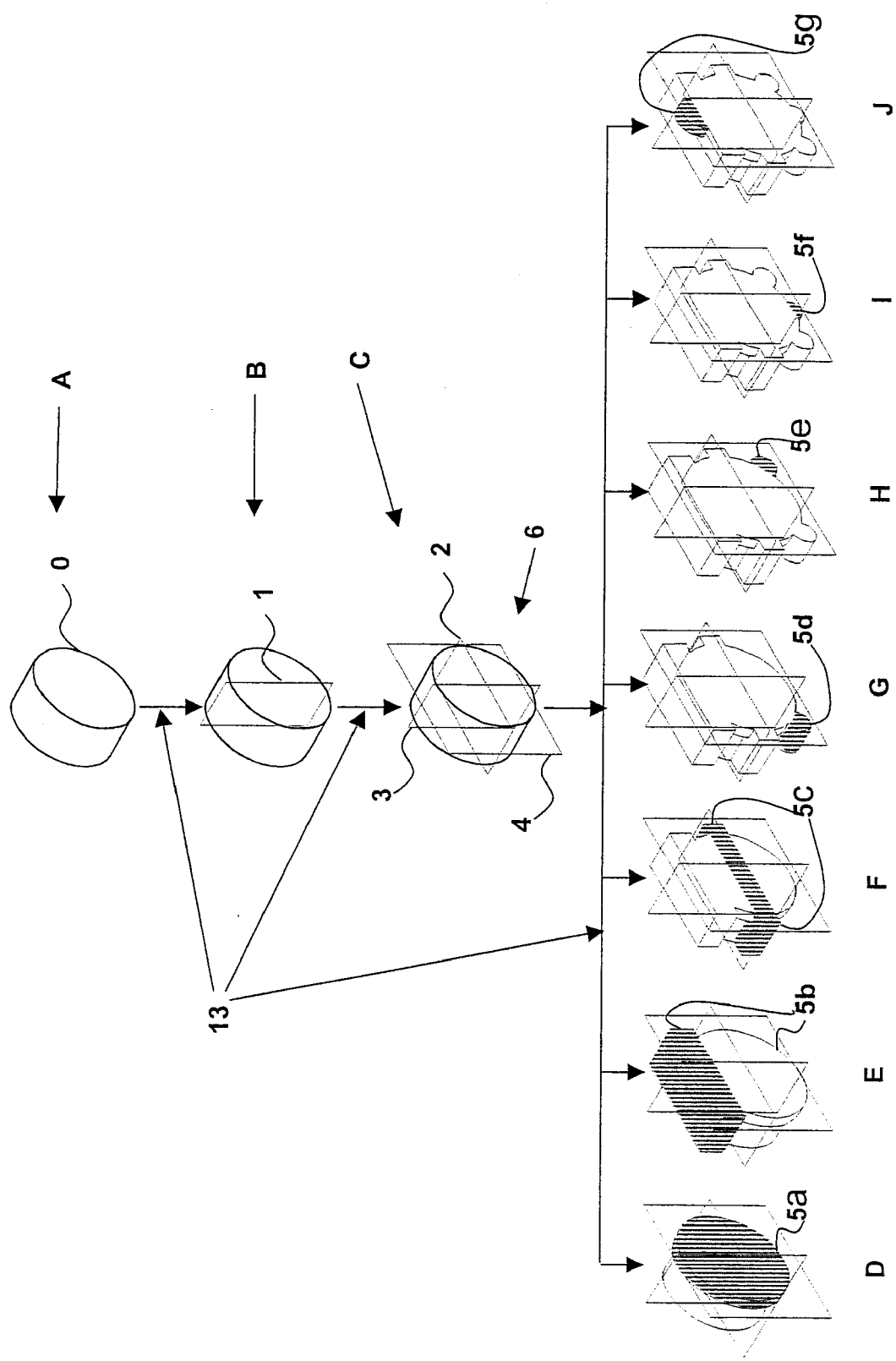
FIG. 1 is a schematic of the horizontal modeling method of the invention.

The method of computer aided design and computer aided manufacture (CAD/CAM) disclosed herein may be implemented on any CAD/CAM software that supports (a) datum planes, (b) parametric modeling capabilities, and (c) feature modeling, or their functional equivalents. Throughout this specification, examples and terminology will refer to Unigraphics v-series software, but this invention is not to be construed to be limited to that particular software package. Other suitable CAD/CAM software packages that meet the three criteria above and that would therefore be suitable for implementing the invention include Solid Edge, also by Unigraphics. Note that the phrases "datum planes", "parametric modeling" and "features" are phrases derived from the Unigraphics v-series documentation and will not likely be used in other software packages. Therefore their functional definitions are set out below.

"Model" refers to the part that is being modeled in the CAD/CAM software. The model comprises a plurality of "features".

"Datum planes" refer to reference features that define Cartesian coordinates by which other features may be referenced to in space. In Unigraphics, the datum planes are two-dimensional, but a plurality of datum planes may be added to a drawing to establish three-dimensional coordinates. These coordinates may be constructed relative to the model so as to move and rotate with the model. Regardless of how the coordinate system is created, for the purposes of this invention it must be possible to reference numerous features to the same coordinate system.

"Parametric modeling capabilities" refers to the ability to place mathematical constraints or parameters on features of the model so that the features may be edited and changed later. Models that do not have this capability are referred to as "dumb solids." Most CAD/CAM systems support parametric modeling.

"Features" refers to parts and details that combine to form the model. A "reference feature", such as a coordinate system, is an imaginary feature that is treated and manipulated like a physical feature, but does not appear in the final physical model.

"Feature modeling" is the ability to build up a model by adding and connecting a plurality of editable features. Not all CAD/CAM software supports this capability. AutoCAD, for example, uses a wire-frame-and-surface methodology to build models rather than feature modeling. A critical aspect of feature modeling is the creation of associative relationships between features, meaning the features are linked such that changes to one feature may alter the others with which it is associated. A preferred associative relationship is a "parent/child relationship".

"Parent/child relationship" is a type of associative relationship between features. A parent/child relationship between a first feature (parent) and a second feature (child) means that changes to the parent feature will affect the child feature (and any children of the child all the way down the familial line), but changes to the child will have no effect on the parent. Further, deletion of the parent results in deletion of all the children and progeny below it.

The present invention relates to the manufacture of a real-world object based upon a virtual CAD/CAM model.

An inventive aspect of this method is that the model is horizontally-structured as described in commonly assigned U.S. Ser. No. 09/483,722, entitled "HORIZONTALLY-STRUCTURED CAD/CAM MODELING", filed on Jan. 14, 2000 herewith, the disclosures of which are incorporated by reference herein in their entirety.

Horizontally-Structured Models

An example of the preferred method of the invention is depicted in FIG. 1. FIG. 1 shows the progressive building up of a model through successive steps A through J. The actual shape of the model depicted in the figures is purely for illustrative purposes only and is not to be understood as limiting to this invention in any manner. In step A we see the creation of the first feature of the model, known as the base feature 0.

Referring again to FIG. 1, we see in step B the creation of another feature, a datum plane that will be referred to as the base-level datum plane 1. This is a reference feature as described above and acts as a first coordinate reference. The arrows 13 that flow from certain steps to another indicate a parent/child relationship between the feature created in the first step with that in the step that follows. Hence, the base feature is the parent of the base-level datum plane. As explained above, any change to the parent will affect the child (e.g., rotate the parent 90 degrees and the child rotates with it), and deletion of the parent results in deletion of the child. This effect ripples all the way down the family line. Since the base feature 0 is the great-ancestor of all steps in the modeling process, any change to the base feature will show up in every step in the process and deletion of the base feature will delete everything. Note that since the base-level datum plane 1 is the child of the base feature 0, any change to the base-level datum plane will have no effect upon the base feature, but will affect all its progeny. As a reference coordinate, the base-level datum plane is useful as a positional tool.

It is preferred that the positioning of the base-level datum plane 1 with respect to the base feature 0 be chosen so as to make the most use of the base-level datum plane as a positional tool. Note that in FIG. 1, the base-level datum plane is chosen to coincide with the center of the cylindrical base feature. By rotating the base-level datum plane symmetrically with the center of the base feature, all progeny will rotate symmetrically about the base feature as well. Differently shaped base features will suggest differently positioned base-level datum planes. Once again, it is noted that datum planes are used here because that is the coordinate system utilized by Unigraphics v-series software. Other software may use coordinate reference features that are linear or three-dimensional. The teachings of this invention are not limited to planar reference features.

In the preferred embodiment of this invention, a second coordinate reference is created as a child of the first coordinate reference described above, though this is not strictly necessary. As seen in Step C of FIG. 1, three datum planes 2, 3, and 4 are created. Each datum plane is orthogonal to the others so that the entire unit comprises a three-dimensional coordinate system 6. The 3-D coordinate system thus created is a relative one, meaning it rotates and moves along with the model. This is in contrast to an absolute coordinate system that exists apart from the model as is common to all CAD/CAM software. Unigraphics software actually has two absolute coordinate systems, a "world" coordinate system and a more local "working level" coordinate system.

Figure 2:
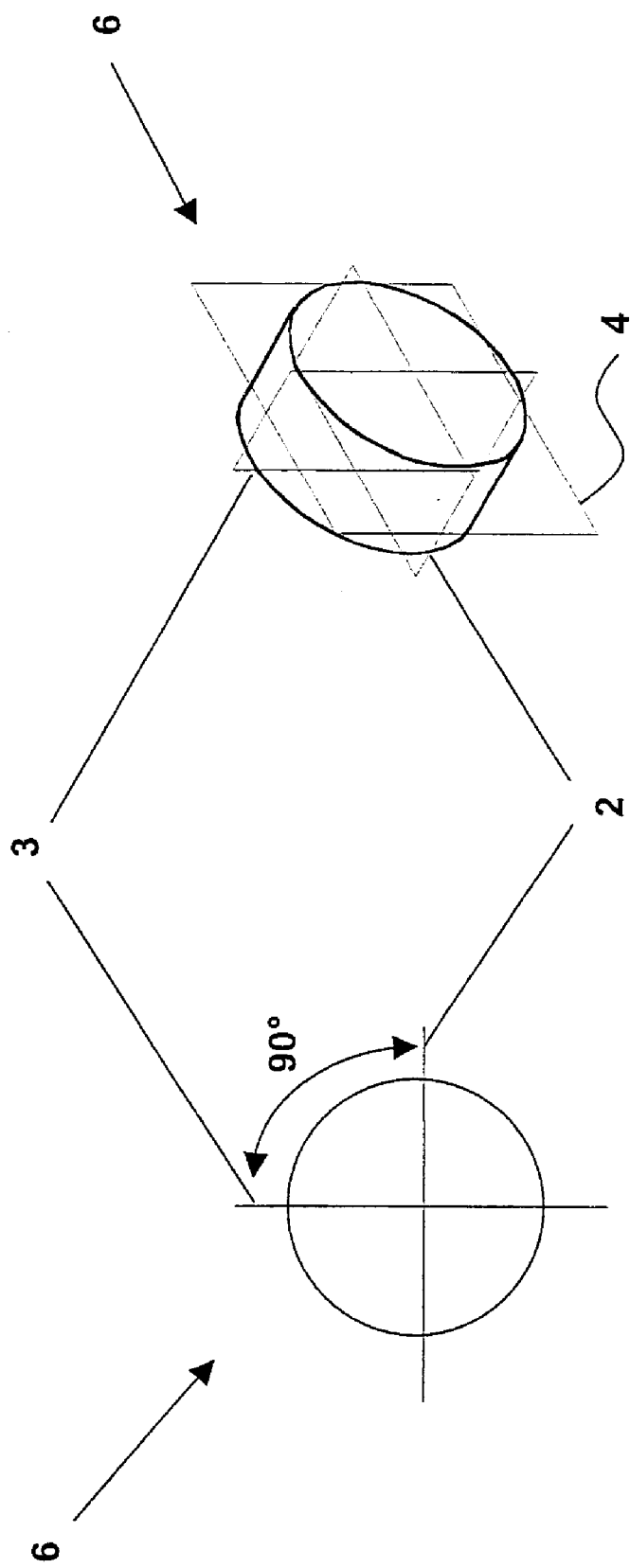
FIG. 2 is a magnified view of the relative 3-D coordinate system used in FIG. 1.

Referring to FIGS. 1 and 2, there are numerous ways to set up the 3-D relative coordinate system 6, but the most preferred when using the Unigraphics v-series is to create a first datum plane 2 that is the child of the base-level datum plane 1 and offset 90 degrees therefrom. Then, a second datum plane 3 is created as a child of the first datum plane 2 and is offset 90 therefrom. Note that the second datum plane 3 now coincides with the base-level datum plane 1, but they are not the same plane. It can be seen that any movement of the base-level datum plane 1 will result in corresponding movement of first 2 and second 3 datum planes of the 3-D coordinate system 6. The third datum plane 4 of the 3-D coordinate system 6 is created orthogonal to both the first and second planes, but is a child of the base feature 0 and will preferably coincide with a surface of the base feature. This is preferred because the Unigraphics software requires that physical features be mounted, or "placed", on a surface though they may be positioned relative to any number of datum planes. The third datum plane of the 3-D coordinate system is therefore referred to as the "face plane," while the first two datum planes of the 3-D coordinate system are referred to as the "positional planes". All physical features added to the model from hereon will be "placed" to the face plane and positioned relative to the positional planes of the 3-D coordinate system. It is an advantage to using datum planes in Unigraphics software that features may be placed upon them just as they may be placed upon any physical feature, making the 3-D coordinate systems created from them much more convenient than simple coordinate systems found on other CAD/CAM software. It must be noted, however, that these techniques only apply to software that utilized datum planes such as Unigraphics v-series. For other software, there may and likely will be other techniques to establishing a 3-D coordinate system relative to the model to which the physical features of the model may be positioned and oriented. This invention is not to be construed as limited to the use of datum planes or to the use of Unigraphics software.

Continuing, we now have a system where the positional datum planes 2, 3, 4 may be manipulated by the single base-level datum plane 1 so as to affect the positioning of all features added to the base feature 0, but with the constraint that the "placement" of each feature is fixed relative to a face of the base feature 0. This is but one of many possible arrangements, but is preferred in the Unigraphics environment for its flexibility. Movement of the base-level datum plane 1 results in movement of the first two positional 2, 3 planes, but with no effect upon the face plane 4. The result is that objects will move when the base-level datum plane 1 is moved, but be constrained to remain placed in the face plane. It is found that this characteristic allows for more convenient and detailed adjustment, though it is a preferred, rather than a mandatory characteristic of the invention.

Referring again to FIG. 1, we see the successive addition of physical features, or form features 5a through 5g, to the model through steps D through J. In step D a circular boss 5a is mounted to the face plane and positioned relative to the positional planes. In each of steps E and F, a pad 5b, 5c is added to the model, thereby creating protrusions on either side. In steps G through J, individual bosses 5d, 5e, 5f, 5g are added to the periphery of the model. Note that in each case, the new feature is mounted to the face plane and positioned relative to the positional planes 2, 3. This means that each feature 5 is the child of the face plane 4 and of each of the positional planes 2, 3. In the embodiment shown, each feature is therefore a grandchild, great-grandchild, and great-great-grandchild of the base feature 0 by virtue of being a child of the face plane 4, first positional plane 2 and second positional plane 3, respectively. This means that movement or changes of the base feature results in movement and changes in all aspects of the added features, including both placement and positioning.

The important aspect of the invention, therefore, can be seen to be that each feature added to the coordinate system of the model is independent of the others. That is to say that no physical feature (except the base feature) is the parent of another. Since no physical feature is a parent, it follows that each individual physical feature may be added, edited, suppressed, or even deleted at leisure without disturbing the rest of the model. It is this powerful advantage of the invention that permits model development to proceed at an order of magnitude faster than traditional CAD/CAM development.

Figure 3:
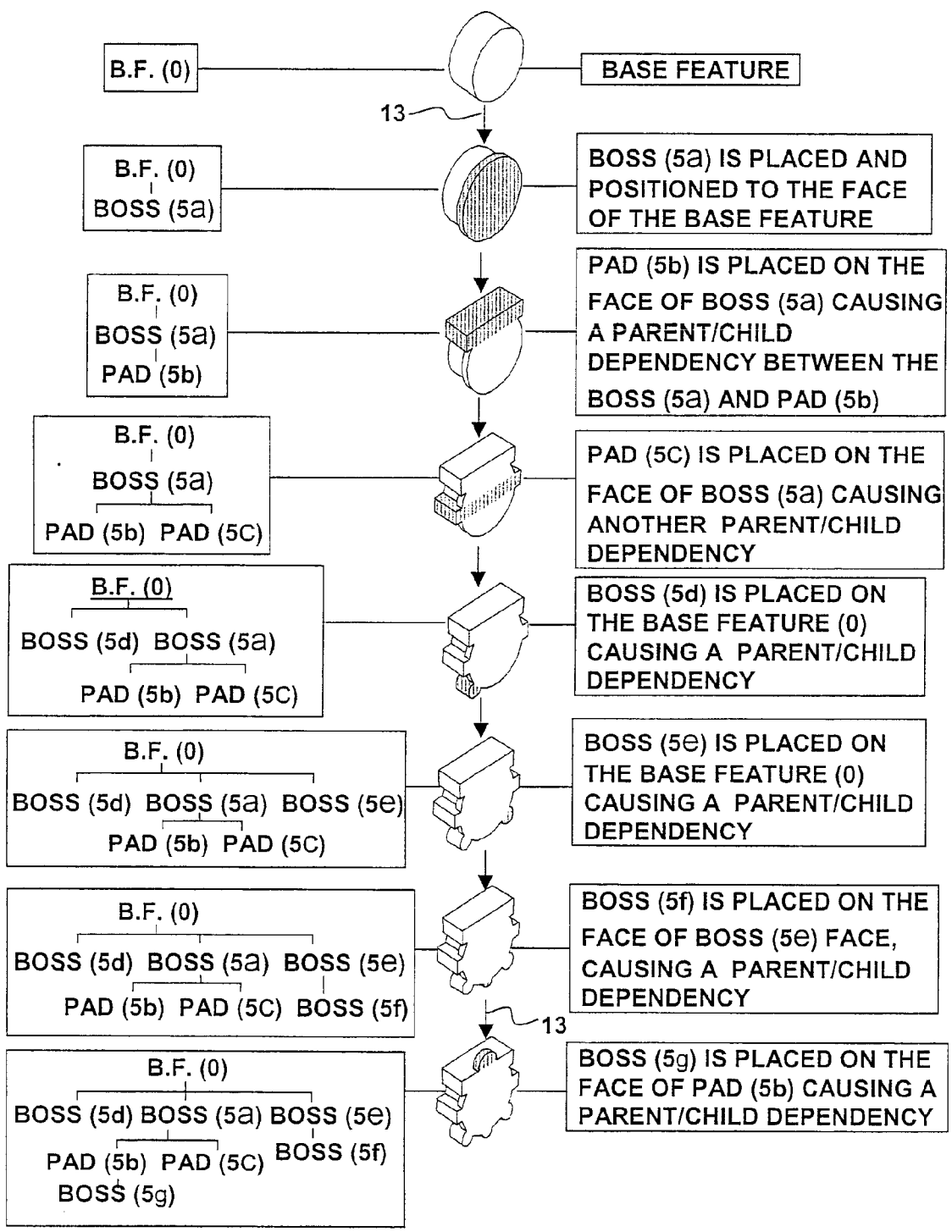
FIG. 3 is an example of the vertical modeling method of the prior art.

To see the advantage more clearly, the "vertical" methods of the prior art are graphically depicted in FIG. 3 and as taught by the Unigraphics User's Manual. The column on the right of FIG. 3 describes the steps taken, the central column shows the change to the model as the result of each step, and the leftmost column shows the changing tree structure. Note that here, since there are no datum planes utilized, there are only seven features as opposed to the eleven in FIG. 1. Observe the complex tree structure generated when features are attached to one another rather than to a central coordinate system. Now consider what happens if the designer decides that the feature designated "Boss (1)" (corresponding to 5 in FIG. 1) is not needed and decides to delete it. According to the tree structure in the lower left of FIG. 3, deletion of "Boss (1)" results in the deletion of "Pad (2)", "Pad (3)" and "Boss (7)". These features must now be added all over again. It is this duplication of effort that makes traditional vertical CAD/CAM design generally frustrating and time-consuming. Actual use of the methods of the invention in the field suggest reductions of a factor of two in the time needed for creation of a model, and time reductions of a factor of ten for making changes to a model. The model used was precisely that shown in the Figures, but with the added features shown in FIG. 4 (various holes).

It should be noted that not all features may be made directly dependent as children from the 3D coordinate system. In the Unigraphics v-series, for example, a groove must be mounted on another physical feature, not a datum plane. Though unfortunate, such features will preferably be added to a single physical feature that itself is a child of the 3-D coordinate system, the idea being to keep the lineage as short as possible to avoid the least rippling effect whenever a feature is altered or deleted.

Figure 4:
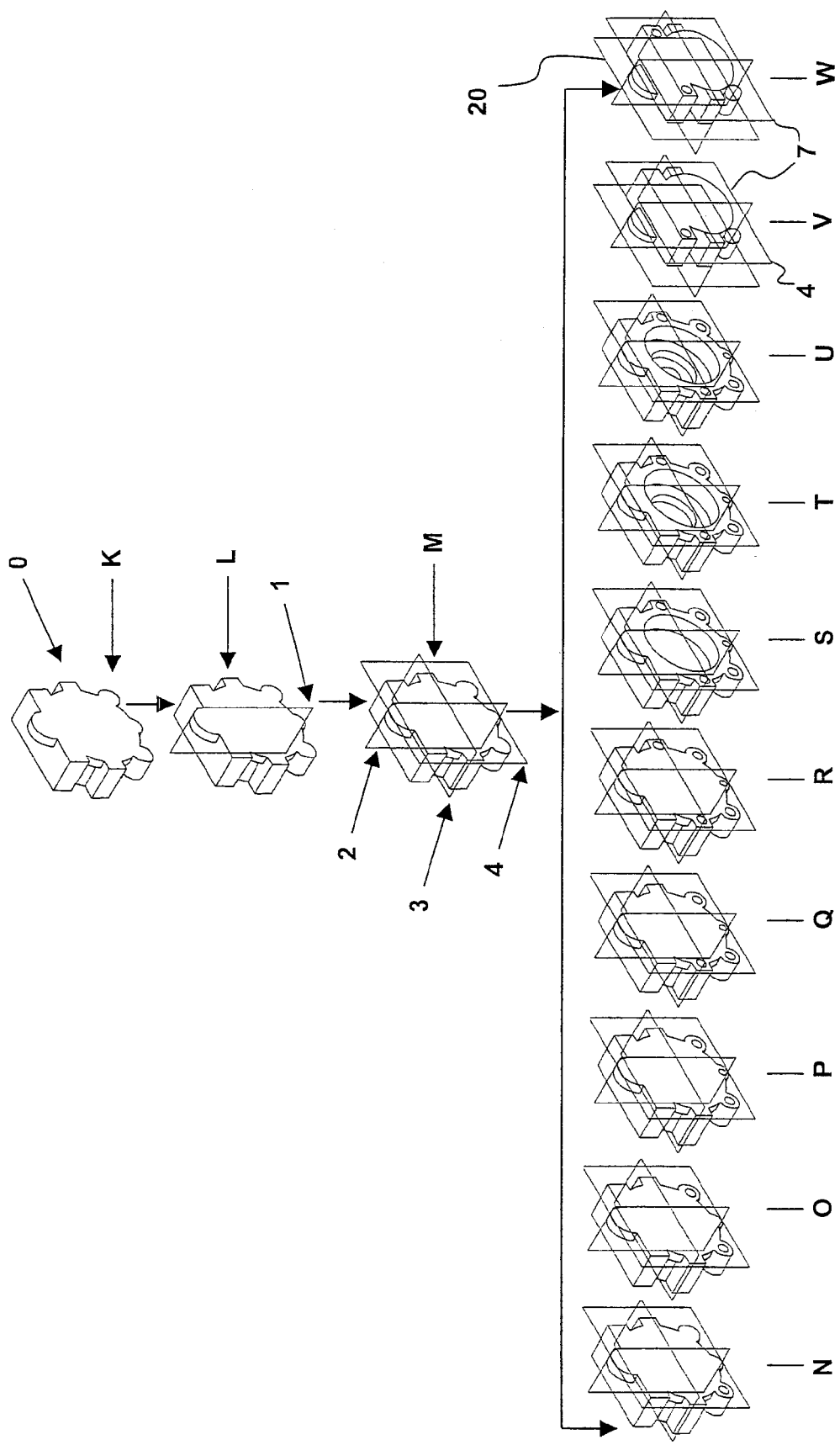
FIG. 4 is another schematic of the horizontal modeling method of the invention.

It must also be noted that additional datum planes may be added as features to the 3-D coordinate system as children just like any physical feature. These would be added as needed to position other physical features, or to place them on surfaces in addition to the original face plane 4. Any additional face planes needed to mount features should be at the same level as the 3-D coordinate system, that is to say a sibling of the original face plane 4, not a child of it. In the example shown, such an added face plane would be created as a child of the base feature 0 just as the first face plane 4 is. In FIG. 4, for example, in step V the model is flipped around and a second face plane 7 is placed on the back as a child of the base feature 0. This allows features to be placed on the back of the object, in this case a counterbore for the holes drilled through the front earlier.

There is an alternative method wherein a base feature 0 shown in FIGS. 1 and 2 is added as a feature, assembly, or a sketch to an existing coordinate system. In this case, an associative datum plane structure would take its place as the zeroth level feature of the model. However, when the 3-D coordinate system is established before the fundamental shape is placed on the screen and presented to the user, it is more difficult for the user to choose coordinates that conform to the natural geometry of the shape, and will usually require going back and editing the coordinate system after the shape is introduced. It is for these reasons, therefore, that starting with a fundamental shape and attaching a relative coordinate system to it is the fastest and preferred method of the invention, at least with Unigraphics software.

The base feature represents a real-word object blank and is usually created in the Unigraphics Master Process Model part file. As an alternative, the base feature can be added to a file as an assembly. This is illustrated in FIG. 4, where the model created in FIG. 1 was added to a file as an assembly and is now read in as the base feature 0 of FIG. 4 for additional operations using the horizontal methods of this invention. The process of reading in an assembly as a base feature is referred to as "promotion" in the Unigraphics environment.

The Manufacturing Process

The manufacturing process of the invention utilizes the horizontal CAD/CAM methods described above to ultimately generate process sheets that are used to control automated machinery to create a real-world part based on a horizontally-structured model. In the most preferred method, "extracts" are used to generate process sheets or other instructions for each step of the machining of the real-world part.

Figure 5:
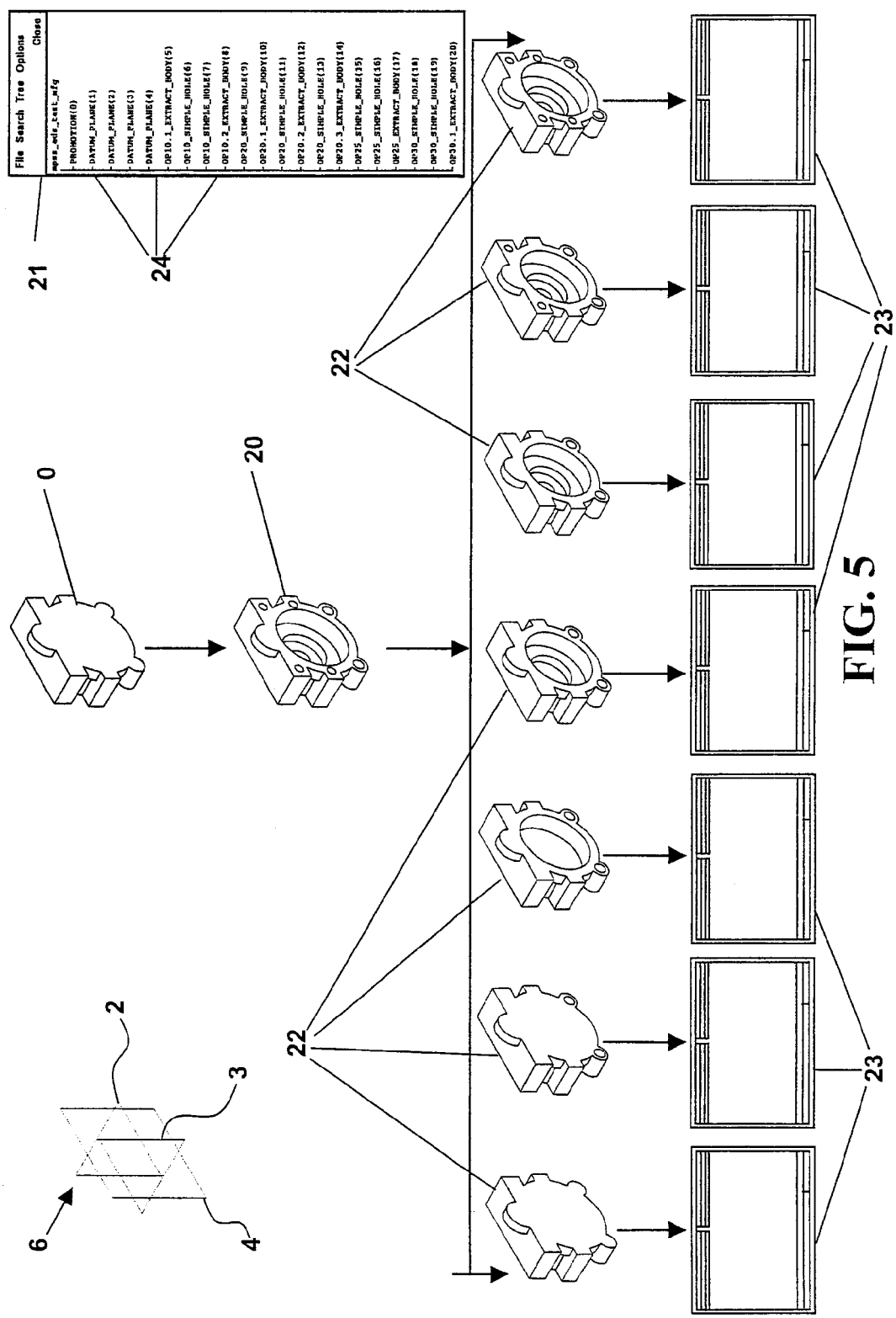
FIG. 5 is a schematic of the manufacturing method of the invention.

Referring to FIG. 5, the first step of the manufacturing process is to select a suitable blank, usually a die cast piece, and use the blank's measurements as the Base Feature 0 of the horizontal design method. Alternatively, a Base Feature can be selected, and a blank manufactured to match it precisely.

Figure 6:
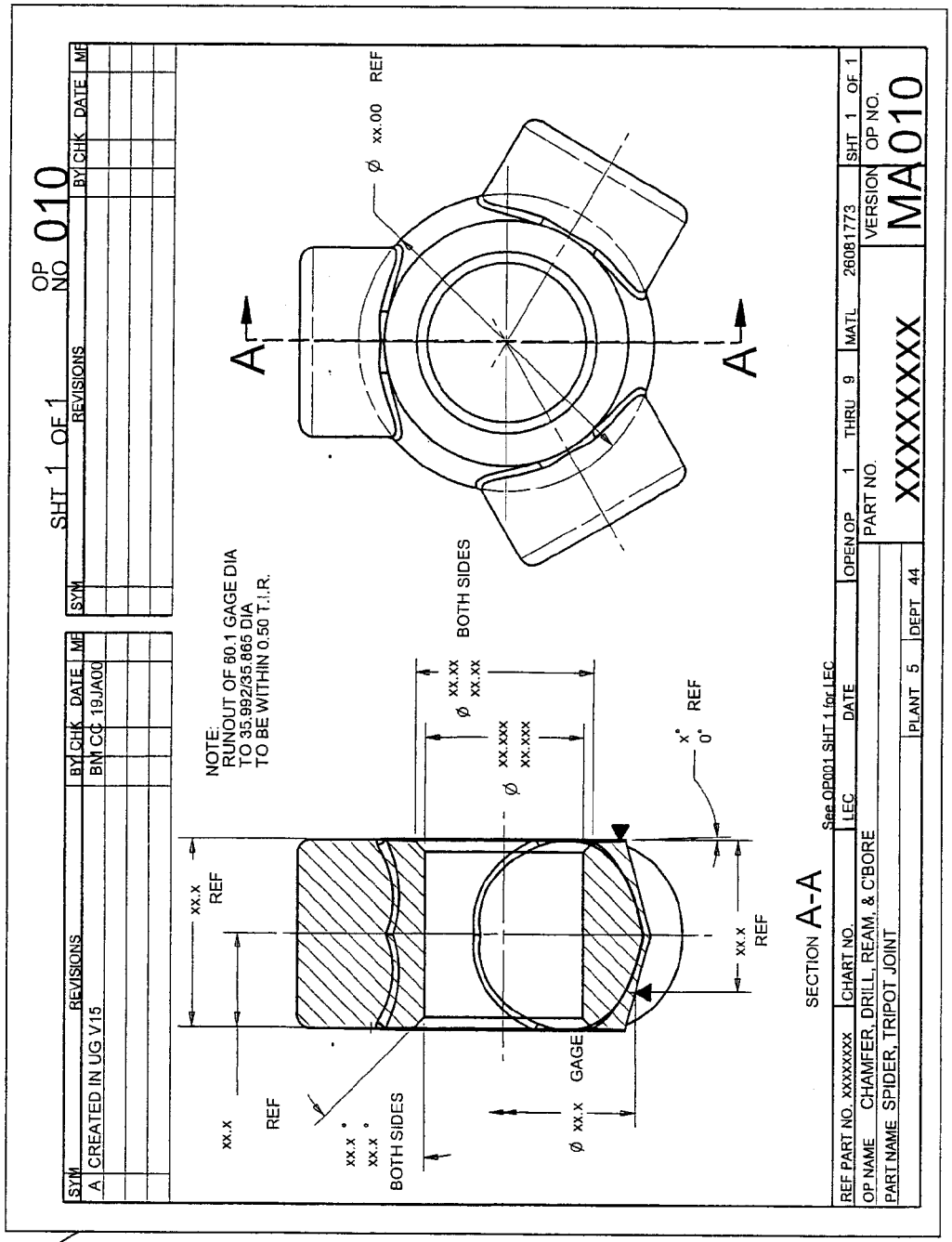
FIG. 6 shows a typical process sheet.

Once a Base Feature has been established that precisely corresponds to a real-world blank, the next step is to build a horizontally-structured model in a manner that describes successive machining operations to be performed on the blank so as to produce the final real-world part. We will refer to this horizontally structured model as the Master Process Model 20. The reader will recognize the Master Process Model 20 as the completed horizontally-structured model in step W of FIG. 4. Referring again to FIG. 5, some CAD/CAM software packages may require that the addition of the features be in the same order as manufacture, in which case a means of reordering the features is preferred. In this case, the reordering means is a displayed list of features 21 that the user may manipulate, the order of features in the list corresponding to that in the Master Process Model. Process sheets 23 are then generated from each operation. The process sheets 23 are used to depict real-time in-process geometry representing a part being machined and can be read by machine operators to instruct them to precisely machine the part. An example of a Unigraphics process sheet is shown in FIG. 6. The geometry can then be used to direct downstream applications, such as cutter paths for Computer Numerical Code (CNC) machines. In a preferred embodiment, the software is adapted to generate such CNC code directly and thereby control the machining process with minimal human intervention, or even without human intervention at all.

The traditional prior art approach to manufacturing modeling is to create individual models representing the real-world component at each step of the manufacturing process.

If a change or deletion was made in one model, it was necessary to individually update each of the other models having the same part. Using the horizontally-structured design of this invention, it is now possible to generate a horizontally-structured Master Process Model and generate a set of process sheets that are linked thereto. Any changes to the Master Process Model are reflected in all the process sheets. As seen in FIG. 5, in Unigraphics software, this linkage between the Master Process Model 20 and the process sheets 23 is preferably achieved through the use of extracted in-process models, called virtual extracts 22, that are linked to the Master Process Model. Each virtual extract represents a step in the manufacturing process and each is a child of the Master Process Model. Any changes to the Master Process Model are automatically reflected in all the relevant extracts, but changes to the extracts have no effect on the Master Process Model. Each extract is a three dimensional snapshot of the Master Process Model at a moment in "time" of its creation, the order of creation being preferably dictated by a user-friendly graphical interface 21, hereinafter referred to as a Model Navigation Tool. The Model Navigation Tool will preferably allow the user to arrange the order of features through simple mouse operations so as to make manipulation of the Master Model as simple and intuitive as practicable. A process sheet 23 is generated for each extract in one-to-one correspondence. Since the Master Process Model is preferably created using the horizontally-structured methods described above, editing the Master Process Model is a simple and expedited matter of adding, editing, suppressing, or deleting individual features of the Master Process Model, which—through the extracts—will automatically update all the process sheets. It is found that the present method of generating process sheets results in a 50% reduction in the time needed to create new process sheets and an 80% reduction in the time required to revise existing process sheets over the vertical modeling methods of the prior art.

Further, the principle of the process may be extended further downstream in the manufacturing process model by utilizing the electronic data for CNC programs, tooling (i.e., cutting tool selection), and fixture design by direct transmission to the machining tools without the need for process sheets and human intervention. This may be achieved in the Unigraphics environment by creating a reference set to the extract and bringing it in to a new file via virtual assembly. The extract is used to create corresponding geometry. Software must then be provided to adapt the CAD/CAM software to translate the geometry into CNC form.

The method of generating process sheets is to begin with a Base Feature and proceed to add features to it in a horizontally-structured manner as described above. The order in which the features are to be machined into the real-world part is decided upon either through automated means or manually by the user with the Model Navigation Tool 21. In the Unigraphics environment an "extract" is then preferably made of the master model corresponding to each added feature representing a manufacturing position or operation. This is done through a software module usually already provided with the CAD/CAM software, otherwise the process must be programmed by the user. In Unigraphics software, the extraction process is handled by the Modeling Module. The Process sheets may then be created from the extracts that are added into the Drafting Module. The extracts created for each operation are children of the model. By changing the Master Model, the extracts—and therefore the manufacturing process—is automatically updated.

One may think of an extract as a "snapshot" of the assembly of the Master Model in progress, showing all of the features up to that point in the assembly, but none that come after it. The process sheet derived from the extract contains the instructions to machine the latest feature that appears at that "snapshot" in time. In the Unigraphics environment, an extract is an associative copy of a model. Features may be added to the extract without appearing in the Master Model, however any features added to the Master Model will appear in the extract if the feature is ordered by the user to be added at or before the manufacturing step represented by the extract.

Referring to FIG. 5, there is shown a typical process sheet as is known in the machining art. A process sheet is a document defining the sequence of operations, process dimensions, and listing of equipment, tools, and gauges required to perform an operation. These documents are utilized by manufacturing personnel to obtain the detailed information required to manufacture and inspect the components depicted thereon. Each process sheet comprises both graphics and text. The graphics portion contains the dimensional characteristics of the part for the particular step in the manufacturing process, the text portion contains various data identifying the part and operation and noting revisions. In the example shown in FIG. 6, we see a part called a "Tripod Joint Spider." The operation that this process sheet depicts is number 10 in a series of operations and is described as a "drill, chamfer and ream" and we can see by the graphics portion of the sheet that a 41 mm hole is to be drilled through the part and chamfered out 48 deg from the central axis of the hole (or 42 deg from the surface of the spider joint) on both sides.

It must be noted that the term "machining" has been used throughout this specification, but the teachings of the invention are applicable to any manufacturing process upon a blank, including welding, soldering, brazing & joining, deformations (e.g., crimping operations), stampings (e.g., hole punchings) and the like. For any of these manufacturing processes, the Master Process Model can be used to represent the entire manufacturing process, from a blank to a finished component. Virtual in-process models (i.e., extracts) can then be created from the Master Process Model to represent each step of the manufacturing process.

It will be understood that a person skilled in the art may make modifications to the preferred embodiment shown herein within the scope and intent of the claims. While the present invention has been described as carried out in specific embodiments thereof, it is not intended to be limited thereby, but rather is intended to cover the invention broadly within the scope and spirit of the claims.

What is claimed is:

1. A horizontal structure method of CAD/CAM manufacturing, comprising:
    creating a Master Process Model, said Master Process Model created by the steps of:
        providing a base feature;
        adding one or more form features fixed to said feature such that substantially not one of said form features is in such associative relationship with another said form feature;
        providing a blank corresponding to said base feature; and
        generating machining instructions to create a real-world object by manufacturing said form features onto said blank.

2. The process of claim 1 wherein said associative relationships are parent/child relationships.

3. The process of claim 1 further comprising creating virtual extracts from said Master Process Model.

4. The process of claim 1 further comprising:

providing a coordinate system;

establishing an associative relationship between said coordinate system and said base feature; and establishing an associative relationship between each said form feature and said coordinate system.

5. The process of claim 4 wherein said associative relationships are parent/child relationships.

6. The process of claim 4 wherein said coordinate system comprises one or more datum planes.

7. The method of claim 6 wherein the step of providing said coordinate system in associative relationship with said base feature comprises the steps of:

providing a first datum plane in an associative relationship to said base feature; and providing a second datum plane in an associative relationship with said first datum plane and orthogonal thereto.

8. The method of claim 6 wherein the step of providing said coordinate system in associative relationship with said base feature comprises the steps of:

providing a base level datum plane in an associative relationship with said base feature;

providing a first datum plane in an associative relationship to said base level datum plane and orthogonal thereto; and providing a second datum plane in an associative relationship with said first datum plane and orthogonal thereto.

9. The method of claim 7 further comprising the steps of:

providing at least a third datum plane as a face plane in an associative relationship to said base feature.

* * * * *